United States Patent
Binder et al.

(10) Patent No.: US 10,296,749 B2
(45) Date of Patent: May 21, 2019

(54) SECURE CLOUD DRIVE

(71) Applicant: Unisys Corporation, Blue Bell, PA (US)

(72) Inventors: David A Binder, Malvern, PA (US); David A Kershner, Malvern, PA (US)

(73) Assignee: Unisys Corporation, Blue Bell, PA (US)

( * ) Notice: Subject to any disclaimer, the term of this patent is extended or adjusted under 35 U.S.C. 154(b) by 134 days.

(21) Appl. No.: 14/958,021

(22) Filed: Dec. 3, 2015

(65) Prior Publication Data

US 2017/0161210 A1    Jun. 8, 2017

(51) Int. Cl.

| | |
|---|---|
| *G06F 11/30* | (2006.01) |
| *G06F 12/14* | (2006.01) |
| *G06F 21/60* | (2013.01) |
| *G06F 21/32* | (2013.01) |
| *G06F 21/62* | (2013.01) |
| *G06F 21/78* | (2013.01) |

(52) U.S. Cl.
CPC ............ *G06F 21/604* (2013.01); *G06F 21/32* (2013.01); *G06F 21/6218* (2013.01); *G06F 21/78* (2013.01)

(58) Field of Classification Search
None
See application file for complete search history.

(56) References Cited

U.S. PATENT DOCUMENTS

| | | | | |
|---|---|---|---|---|
| 2007/0057763 A1* | 3/2007 | Blattner | .............. | G06F 3/03543 340/5.52 |
| 2011/0246766 A1* | 10/2011 | Orsini | ................. | G06F 11/1076 713/160 |
| 2011/0307724 A1* | 12/2011 | Shaw | .................... | G06F 21/305 713/323 |
| 2012/0036358 A1* | 2/2012 | Johnson | ................. | G06F 21/62 713/168 |
| 2014/0143545 A1* | 5/2014 | McKeeman | ........ | H04L 63/0853 713/168 |
| 2016/0219034 A1* | 7/2016 | Hintermeister | ....... | H04L 63/083 |

* cited by examiner

*Primary Examiner* — Kambiz Zand
*Assistant Examiner* — Arezoo Sherkat

(57) ABSTRACT

A SCD includes a processor configured to establish operating functions of the SCD. The SCD further includes a computer-readable medium including a setup volume and a storage volume. The setup volume is configured to store information that is decrypted. The storage volume is configured to store information that is encrypted. The setup volume includes instructions that establish at least one authentication process. The encrypted information stored in the storage volume is decrypted after completing the at least one authentication process. The SCD further includes a universal serial bus (USB) connector configured to transmit information stored in the computer-readable medium to a host or a user. The SCD further includes a battery that powers the SCD.

17 Claims, 11 Drawing Sheets

SECURE CLOUD DRIVE

FIELD OF THE DISCLOSURE

The instant disclosure relates generally to cloud storages and cloud services. More specifically, this disclosure relates to embodiments of apparatuses, systems, and methods involving a secure cloud drive (SCD), which is a portable computer-readable medium accessible through the Internet.

BACKGROUND

Vendors providing cloud storages and cloud services store user accessible information at server farms. A server farm requires physical infrastructures for maintaining clusters of computers. The infrastructures of server farms cannot be easily transported. The immobility of server farms limits the potential applications and further developments of could storages and/or cloud services.

SUMMARY

The instant disclosure relates generally to cloud storages and cloud services. More specifically, this disclosure relates to embodiments of apparatuses, systems, and methods involving a secure cloud drive (SCD), which is a portable computer-readable medium accessible through the Internet. According to one embodiment, an apparatus of SCD includes a processor configured to establish operating functions of the SCD. The SCD further includes a computer-readable medium including a setup volume and a storage volume. The setup volume is configured to store information that is decrypted. The storage volume is configured to store information that is encrypted. The setup volume includes instructions that establish at least one authentication process. The encrypted information stored in the storage volume is decrypted after completing the at least one authentication process. The SCD further includes a universal serial bus (USB) connector configured to transmit information stored in the computer-readable medium to a host or a user. The SCD further includes a battery that powers the SCD.

According to another embodiment, a method includes receiving, at a first processor, a request to check a status of a secure cloud drive (SCD). The SCD includes a second processor configured to establish operating functions of the SCD. The SCD further includes a computer-readable medium including a setup volume and a storage volume. The setup volume is configured to store information that is decrypted. The storage volume is configured to store information that is encrypted. The setup volume includes instructions that establish at least one authentication process. The encrypted information stored in the storage volume is decrypted after completing the at least one authentication process. The SCD further includes a universal serial bus (USB) connector configured to transmit information stored in the computer-readable medium to a host or a user. The SCD further includes a battery that powers the SCD. The method further includes determining, at the first processor, whether the status of the SCD has a security alert. The method further includes instructing the SCD, by the first processor, to take security action if there is a security alert.

According to another embodiment, a method includes receiving, at a secure cloud drive (SCD), a request to authenticate. The SCD includes a processor configured to establish operating functions of the SCD. The SCD further includes a computer-readable medium including a setup volume and a storage volume. The setup volume is configured to store information that is decrypted. The storage volume is configured to store information that is encrypted. The setup volume includes instructions that establish at least one authentication process. The encrypted information stored in the storage volume is decrypted after completing the at least one authentication process. The SCD further includes a universal serial bus (USB) connector configured to transmit information stored in the computer-readable medium to a host or a user. The SCD further includes a battery that powers the SCD. The method further includes determining, at the SCD, whether the request is from a host or a user. The method further includes conducting, at the SCD, the authentication process designated for the host, if the request is from the host. The method further includes conducting, at the SCD, the authentication process designated for the user, if the request is from the user.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

Figure 1A:
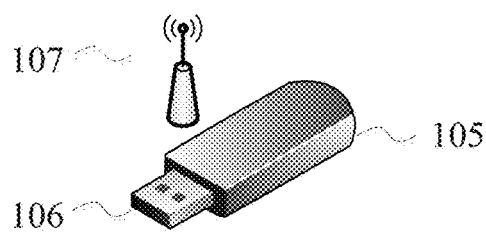
FIG. 1A is a schematic illustration of a secure cloud drive according to one embodiment of the disclosure.

A "host" means a person using a computer that is physically connected to a SCD. A "host computer" means the computer the host is using. The term "host" may also include the meanings of a "host computer." In one embodiment, a "host" or a "host computer" is a computer that a SCD is physically connected to by plugging the SCD into an USB receiving port of the computer.

A "user" means a person using a computer that does not have a physical connection with a SCD. A "user computer" means the computer the user is using. A user attempts to access the information stored in the SCD remotely through any wired and/or wireless connections, e.g., Ethernet, WiFi, cellular, or the like. The term "user" may also include the meaning of a "user computer." In one embodiment, a "user" or a "user computer" accesses the information stored in a SCD through an Ethernet.

"Encrypt" means encoding the information stored in a computer-readable medium to a secret format such that the information cannot be accessed by targeted users and/or hosts without completing an authentication process. In one embodiment, the "storage volume being configured to store information that is encrypted" means that the storage volume stores information that is encoded in a secret format that is not accessible by targeted users and/or hosts without completing an authentication process. In one embodiment, encrypted information stored in a storage volume of a SCD may be decrypted after completing the authentication process.

"Decrypt" means encoding the information stored in a computer-readable medium in a format that can be accessible to targeted users and/or hosts without an authentication process. Encrypted information may be transformed to decrypted information after completing the authentication process. In one embodiment, encrypted information stored in a storage volume of a SCD may be decrypted after completing the authentication process.

An "authentication process" is a process for determining the identity of a user/host and determining what authority the user/host has over the information stored in a SCD. The authority that the user/host may have over the information stored in a SCD includes, for example, read, write, delete, etc, the information stored in the SCD. The authentication process is user/host specific, meaning the authentication process may be different for each user/host. In one embodiment, the authentication process for a host may include checking a biometric feature, e.g., fingerprint, voice pattern, retina pattern, or the like. In one embodiment, after completing the authentication process, a host may read, write, and delete information stored in one or any portion of the computer-readable medium of a SCD. In another embodiment, the authentication process for a user may include checking a password. In yet another embodiment, after completing the authentication process, a user may read and write the information stored in a first storage volume of the SCD, but may only read (not write) information stored in a second storage volume of the SCD. In yet another embodiment, after completing the authentication process, a user or a host may not have access to information of a certain storage volume of the SCD at all.

A "data connection" is an electrical, magnetic, and/or optical signal connection that communicates information. A data connection may be established through a wired connection, e.g., USB, Ethernet, local area network, etc. A data connection may also be established through a wireless connection, e.g., IEEE 802.11x (WiFi), long term evolution (4G LTE), or the like. A data connection may be established through an optical connection, e.g., optic fibers, or the like. A data connection may connect a SCD, a host, a user, and/or a cloud service.

The term "instruction" means a processor-executable instruction, for example, an instruction in a programming code. An instruction may be executed by any suitable processor, for example, x86 processor. An instruction may be programmed in any suitable computer language, for example, machine codes, assembly language codes, C language codes, C++ language codes, Fortran codes, Java codes, Matlab codes, or the like. Instructions may establish operation functions of a SCD similar to the operating functions performed in a typical operating system, e.g., Unix, Linux, Windows, iOS, Android, etc. Instructions may also establish an authentication process of the SCD.

FIG. 1A is a schematic illustration of a secure cloud drive (SCD) 105 according to one embodiment of the disclosure. The SCD 105 shown in FIG. 1A may be the SCD shown in FIGS. 1B and 1C. The SCD 105 may include the volume structure shown in FIG. 2. The SCD 105 may be used to implement the methods shown in FIGS. 3 and 6-7. The SCD 105 may be used in the network connections shown in FIGS. 4A-D and 5A-B. The SCD 105 may be used in the embodiments shown in FIGS. 8-10.

As shown in FIG. 1A, the SCD 105 includes a USB connector 106 and a wireless connection 107. The SCD 105 may be in a portable size that can easily be physically transported. A person may easily plug and unplug the SCD 105 from a computer and transport the SCD 105 from one location to another by carrying the SCD 105 in his pocket. In other embodiments, a SCD 105 may include either just the USB connector 106 or just the wireless connection 107. In one embodiment in which the SCD 105 includes just the USB connector 106, a user may connect to the SCD 105 through a data connection that includes a host computer physically connected to the SCD 105. In another embodiment in which the SCD 105 includes just the wireless connection 107, a user may connect to the SCD 105 through a data connection, e.g., wireless connection, that does not include a host computer.

Figure 1B:
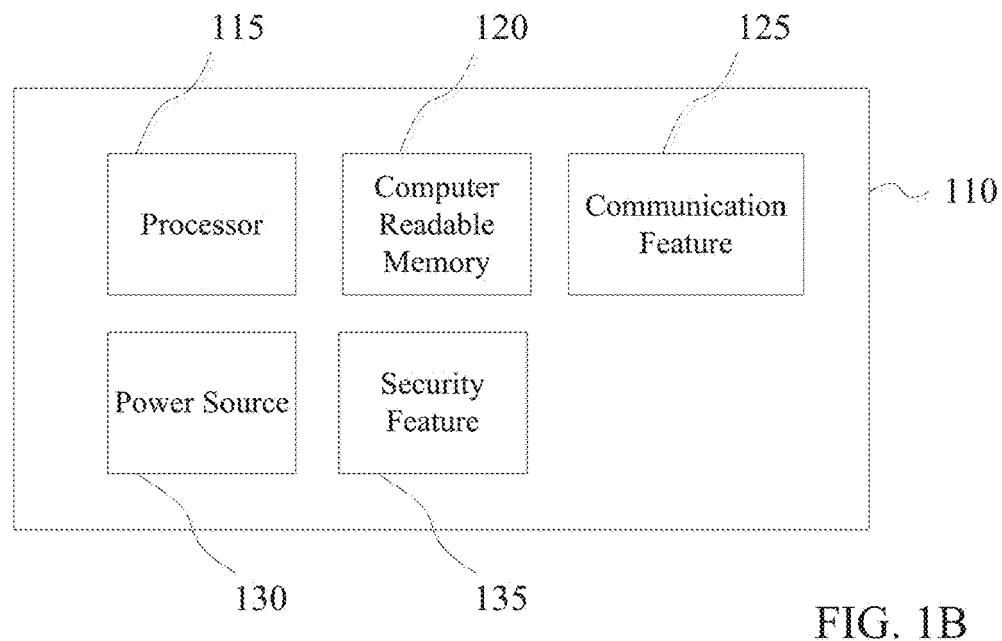
FIG. 1B is a schematic block diagram of a secure cloud drive according to one embodiment of the disclosure.

FIG. 1B is a schematic block diagram of a secure cloud drive (SCD) 110 according to one embodiment of the disclosure. The SCD 110 shown in FIG. 1B may be the SCD 105 shown in FIG. 1A and SCD 140 shown in FIG. 1C. The SCD 110 may include the volume structure shown in FIG. 2. The SCD 110 may be used to implement the methods shown in FIGS. 3 and 6-7. The SCD 110 may be used in the network connections shown in FIGS. 4A-D and 5A-B. The SCD 110 may be used in the embodiments shown in FIGS. 8-10.

As shown in FIG. 1B, the SCD 110 includes a processor 115, a computer-readable memory 120, a communication feature 125, a power source 130, and a security feature 135. In one embodiment, the processor 115 executes instructions that establish various operating functions of the SCD 110. The instructions executed by the processor 115 may be programming codes, e.g., machine codes, assembly language codes, C language codes, C++ language codes, Fortran codes, Java codes, Matlab codes, or the like. The operation functions established by the instructions may include all the operating functions included in a typical operating system, e.g., Unix, Linux, Windows, iOS, Android, etc. In some examples, the operation functions include booting the SCD 110, connecting the SCD 110 to a data connection, writing/storing information to the computer-readable medium 120 of the SCD 110, reading information from the computer-readable medium 120 of the SCD 110, conducting an authentication process of the SCD 110, etc.

The computer-readable memory 120 may be any type of suitable computer memory, e.g., non-volatile memory (for example, read-only memory, flash memory, ferroelectric random access memory (FeRAM), etc.) and/or volatile memory (RAM, dynamic RAM, synchronous RAM, etc.). In one embodiment, the computer-readable memory 120 may include a flash memory (non-volatile memory) and a random access memory (volatile memory), wherein information is permanently stored in the flash memory and is copied to the random access memory when read. The computer-readable memory 120 may be separated into different volumes, e.g., a setup volume and a storage volume. A setup volume may store decrypted information. A setup volume may include instructions executable by the processor 115. A storage volume may store encrypted information. A storage volume may include information stored by a host and/or user.

The communication feature 125 allows the information stored in the computer-readable memory 120 to be communicated with other computers through a data connection. The communication feature 125 may be any suitable electronic communication including wired and/or wireless communications. In some embodiments, the communication feature 125 may include wired communications, such as USB communication. In other embodiments, the communication feature 125 may include wireless communications, such as Wifi, IEEE 802.11x, LTE, or the like.

The power source 130 provides power to the SCD 110 to support the operations of the SCD 110. In one embodiment, the power source 130 is connected to a power grid, e.g., wall plug. In another embodiment, the power source 130 is a battery. In yet another embodiment, the power source 130 is a battery that can be recharged through, for example, an USB connection.

The security feature 135 includes both the hardware and software for establishing an authentication process. The security feature 135 may include hardware for checking biometric features, such as a fingerprint scanner, a retina pattern recognizer, a microphone for voice recognition, etc. The security feature 135 may include instructions executable by the processor 115 for conducting an authentication process.

Figure 1C:
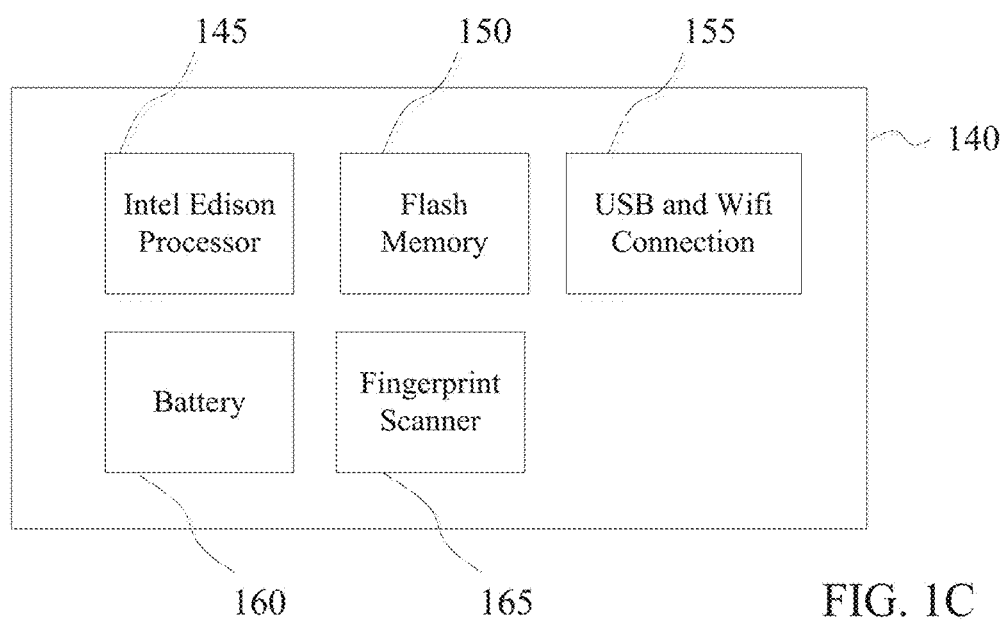
FIG. 1C is a schematic block diagram of a secure cloud drive according to one embodiment of the disclosure.

FIG. 1C is a schematic block diagram of a secure cloud drive 140 according to one embodiment of the disclosure. The SCD 140 shown in FIG. 1C may be the SCD 105 shown in FIG. 1A and the SCD 110 shown in FIG. 1B. The SCD 140 may include the volume structure shown in FIG. 2. The SCD 140 may be used to implement the methods shown in FIGS. 3 and 6-7. The SCD 140 may be used in the network connections shown in FIGS. 4A-D and 5A-B. The SCD 140 may be used in the embodiments shown in FIGS. 8-10.

As shown in FIG. 1C, the SCD 140 includes an Intel Edison processor 145, a flash memory 150, a USB and a Wifi connection 155, a battery 160, and a fingerprint scanner 165. In one embodiment, the Intel Edison processor 145 may execute instructions that establish operating functions of the SCD 140.

In one embodiment, the flash memory 150 may include a setup volume and a storage volume, wherein the setup volume is configured to store information that is decrypted, and the storage volume is configured to store information that is encrypted. In one embodiment, the setup volume includes instructions executable by the Intel Edison 145 that establish at least one authentication process. In another embodiment, when the authentication process is completed, the encrypted information stored in the storage volume of the flash memory 150 may be decrypted.

In one embodiment, the USB and Wifi connection 155 allows decrypted information stored in the setup volume and/or the storage volume to be communicated with a host and/or a user.

In one embodiment, the battery 160 may be a battery that self-sufficiently supports the operations of the SCD 140. In another embodiment, the battery 160 may be a rechargeable battery that can be recharged through an USB connection.

In one embodiment, the fingerprint scanner 165 is included in an authentication process of SCD 140. In another embodiment, when the authentication process is completed, e.g., the fingerprint of a person matches a record stored in the SCD 140, the encrypted information stored in the storage volume of the flash memory 150 may be decrypted.

Figure 2:
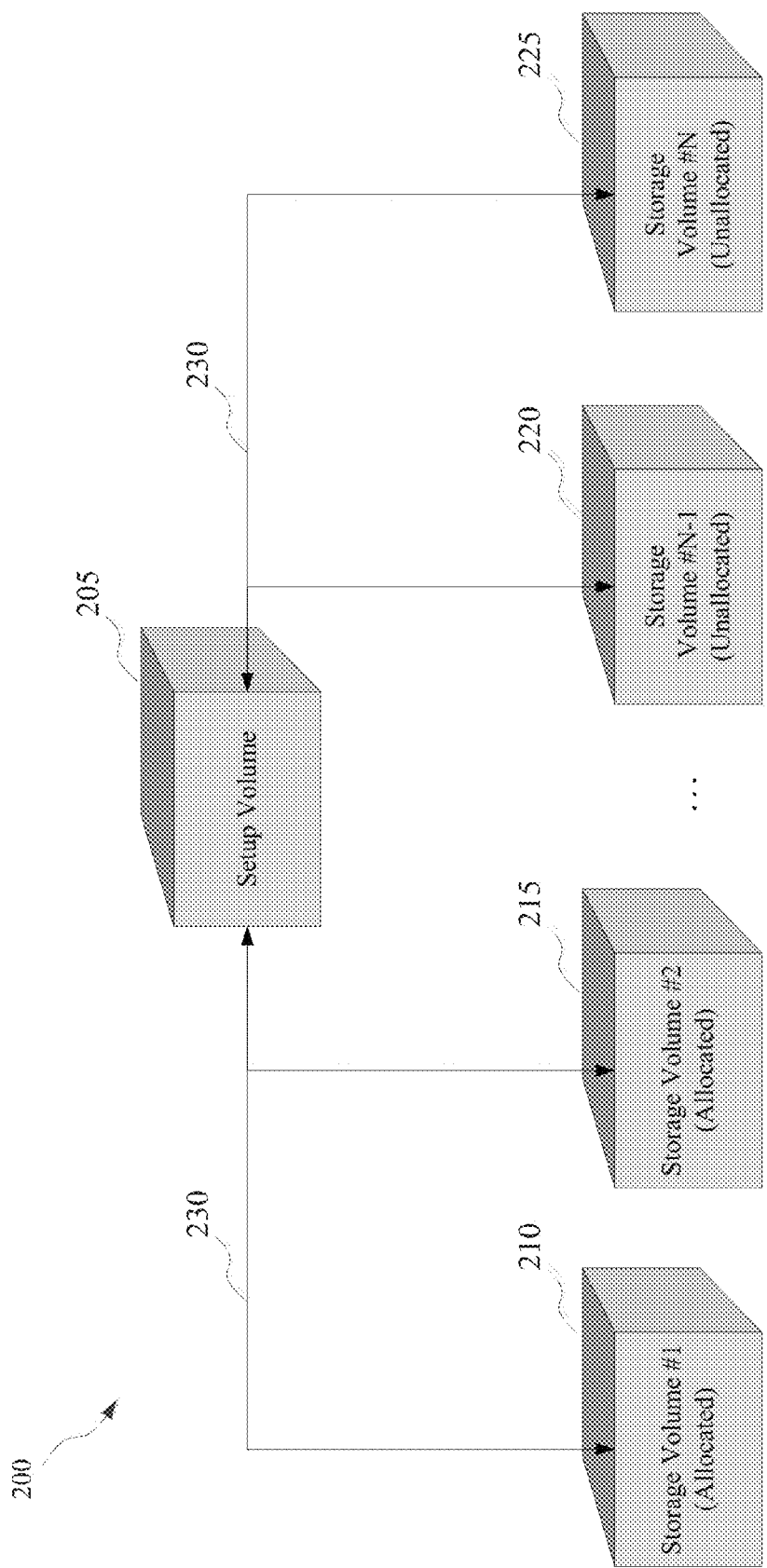
FIG. 2 is a schematic block diagram showing a volume structure of a secure cloud drive according to one embodiment of the disclosure.

FIG. 2 is a schematic block diagram showing a volume structure 200 of a secure cloud drive according to one embodiment of the disclosure. The volume structure 200 may be included in the SCDs 105, 110, and 140 shown in FIGS. 1A-1C. The volume structure 200 may be include in the SCDs used in the apparatuses, systems, and methods shown in FIGS. 3-7. The volume structure 200 may be included in the embodiments shown in FIGS. 8-10.

As shown in FIG. 2, the volume structure 200 includes a setup volume and a plurality of storage volumes 210, 215, 220, 225. As shown in FIG. 2, the storage volume #1 210 and #2 215 are allocated. In one embodiment, a storage volume that is allocated means it is formatted and partitioned so as to be separated from other volumes in a computer-readable medium. In another embodiment, the storage volumes 210, 215 may be assigned to store information for specific user(s) and/or host(s). As shown in FIG. 2, the storage volume #N−1 220 and storage volume #N 225 are unallocated. In one embodiment, unallocated volume means a portion of a computer-readable medium that is not formatted and/or not partitioned. In another embodiment, the unallocated volume means a portion of a computer-readable medium that is not yet assigned to specific user(s) and/or host(s) for storing information. The setup volume 205 may be connected to storage volumes 210, 215, 220, 225 through one or more data connections 230.

In one embodiment, the information stored in the setup volume 205 is decrypted. In one embodiment, the instructions stored in the setup volume 205 are automatically executed. For example, the instructions for basic operating functions and authentication processes of the SCD may be automatically executed when the SCD is plugged in a host computer.

In another embodiment, the information stored in the storage volume 210, 215, 220, 225 is encrypted. The encrypted information may not be accessible to a user/host without completing the authentication process. The authentication process may include, for example, verifying a biometric feature, verifying a password, etc. In one embodiment, when the authentication process is completed, the encrypted information in the storage volume 210, 215, 220, 225 may be decrypted.

Figure 3:
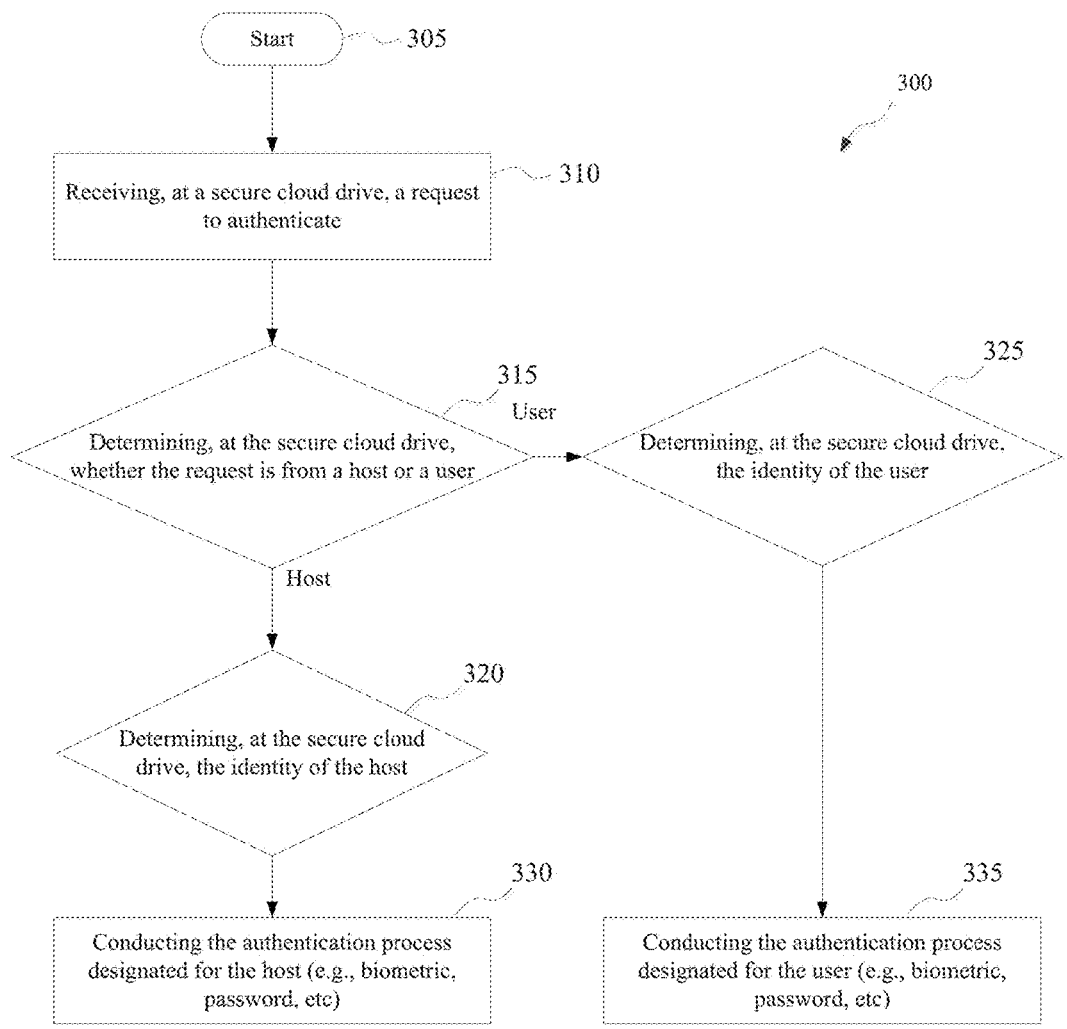
FIG. 3 is a flow chart illustrating an authentication process of a secure cloud drive according to one embodiment of the disclosure.

FIG. 3 is a flow chart illustrating an authentication process 300 of a secure cloud drive according to one embodiment of the disclosure. The authentication process 300 may be included in the SCD 105 in FIG. 1A. The authentication process 300 may be included in the security feature 135 in FIG. 1B. The authentication process 300 may be used in combination with the fingerprint scanner 165 in FIG. 1C. The instructions establishing the authentication process 300 may be stored in the setup volume 205 in FIG. 2. The authentication process 300 may be used as part or in combination with the methods shown in FIGS. 6-7. The authentication process 300 may be used in the network connections shown in FIGS. 4A-D and 5A-B. The authentication process 300 may be implemented in the embodiments shown in FIGS. 8-10.

The authentication process 300 starts at block 305. The authentication process 300 continues to block 310, which includes receiving, at a SCD, a request to authenticate. The authentication process 300 proceeds to block 315, which includes determining, at the SCD, whether the request is from a host or a user. If the request is made by a host, the authentication process 300 proceeds to block 320, which includes determining, at the SCD, the identity of the host. The authentication process 300 proceeds to block 320, which includes conducting the authentication process designated for the host (e.g., biometric feature, password, etc). If the request is made by a user, the authentication process 300 proceeds to block 325, which includes determining, at the SCD, the identity of the user. The authentication process 300 proceeds to block 335, which includes conducting the authentication process designated for the user (e.g., biometric feature, password, etc). It is noted that a SCD may include a plurality of authentication processes. Different authentication processes may be required for different users/hosts to access the information stored in the SCD. In one embodiment, a host may need to complete both biometric feature and password authentication to access the information stored in the SCD. In another embodiment, a user may need to complete just password authentication to access the information stored in the SCD.

Figure 4A:
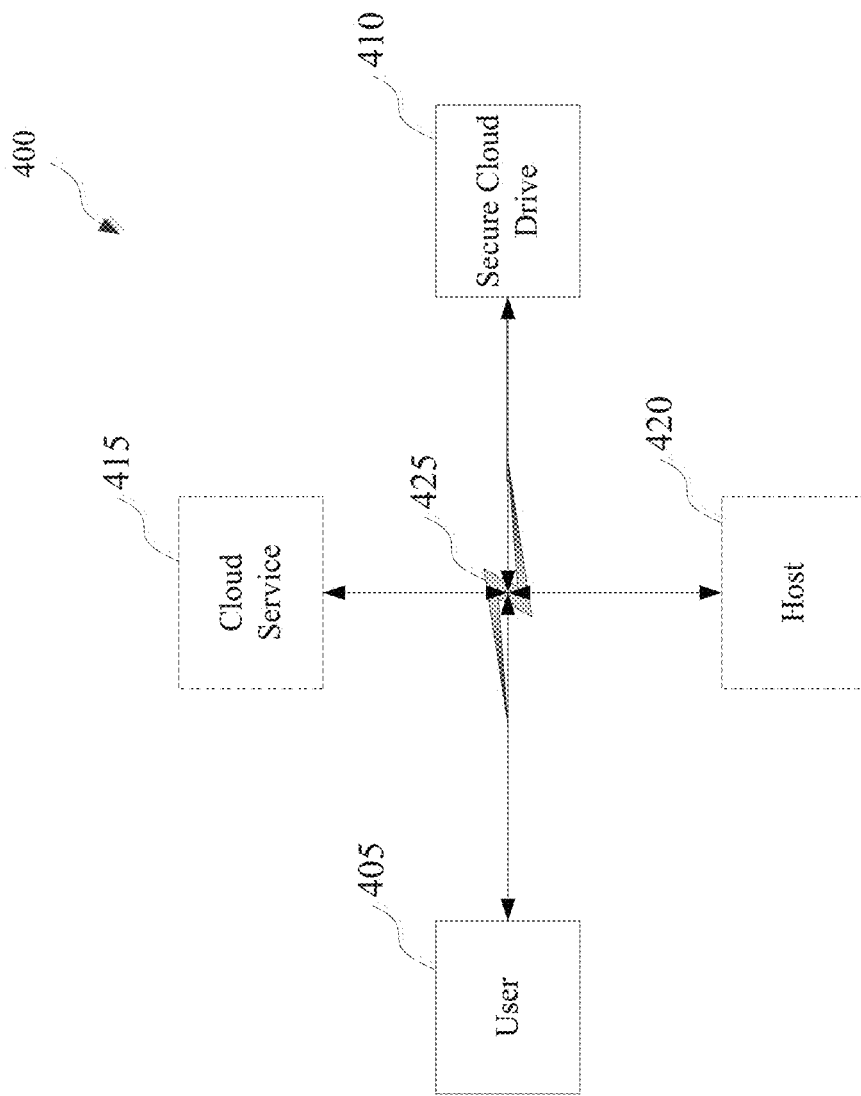
FIG. 4A is a schematic block diagram illustrating a network connection including a secure cloud drive according to one embodiment of the disclosure.

FIG. 4A is a schematic block diagram illustrating a network connection 400 including a secure cloud drive 410 according to one embodiment of the disclosure. The network connection 400 may include any of the SCDs 105, 110, 140 shown in FIGS. 1A-1C. The network connection 400 may include a SCD that has the volume structure 200 shown in FIG. 2. The network connection 400 may be used as part or in combination with the network connections shown in FIGS. 4B-4C and 5A-5B. The network connection 400 may include a SCD that conducts the methods shown in FIGS. 6 and 7. The network connection 400 may be used in the embodiments shown in FIGS. 8-10.

As shown in FIG. 4A, a user 405 is connected to a data connection 425. A cloud service 415 is connected to the data connection 425. A host 420 is connected to the data connection 425. A SCD 410 is connected to the data connection 425. Through the data connection 425, the user 405, the cloud service 415, the host 420, and the secure cloud drive 410 may exchange information with one another. It is noted that the host 420 and the cloud service 415 are optional as indicated with dashed boxes. In one embodiment, the SCD 410 can be a standalone apparatus connected to the data connection 425. In another embodiment, the SCD 410 can be attached to a host computer through an USB connection.

Figure 4B:
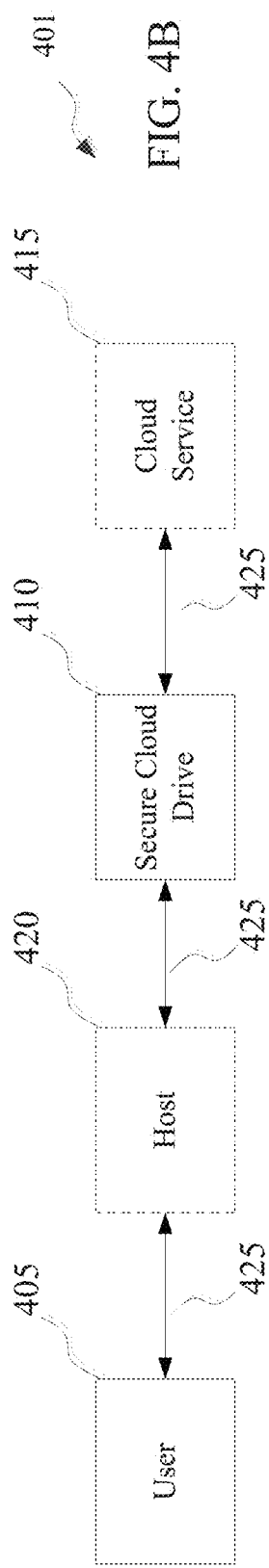
FIG. 4B is a schematic block diagram illustrating a network connection including a secure cloud drive according to one embodiment of the disclosure.

FIG. 4B is a schematic block diagram illustrating a network connection 401 including a secure cloud drive 410 according to one embodiment of the disclosure. The network connection 401 may include any of the SCDs 105, 110, 140 shown in FIGS. 1A-1C. The network connection 401 may include a SCD that has the volume structure 200 shown in FIG. 2. The network connection 401 may be used as part or in combination with the network connections shown in FIGS. 4A, 4C, and 5A-5B. The network connection 401 may include a SCD that conducts the methods shown in FIGS. 6 and 7. The network connection 401 may be used in the embodiments shown in FIGS. 8-10.

As shown in FIG. 4B, a user 405 is connected to a host 420 through a data connection 425. The host 420 is connected to a SCD 410 through the data connection 425. The SCD 410 is connected to a cloud service 415 through the data connection 425. As shown in FIG. 4B, the user 405 is connected to the SCD 410 through the host 420. The user 405 is connected to the cloud service 415 through the host 420 and the secure cloud drive 410.

Figure 4C:
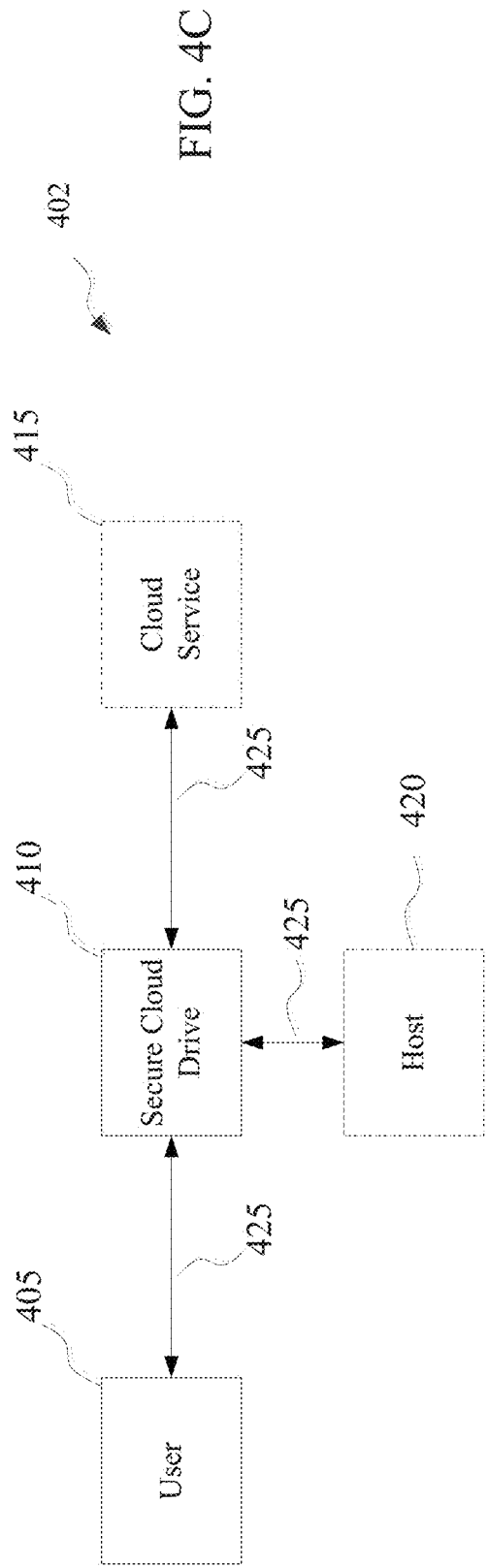
FIG. 4C is a schematic block diagram illustrating a network connection including a secure cloud drive according to one embodiment of the disclosure.

FIG. 4C is a schematic block diagram illustrating a network connection 402 including a secure cloud drive 410 according to one embodiment of the disclosure. The network connection 402 may include any of the SCDs 105, 110, 140 shown in FIGS. 1A-1C. The network connection 402 may include a SCD that has the volume structure 200 shown in FIG. 2. The network connection 402 may be used as part or in combination with the network connections shown in FIGS. 4A-4B, and 5A-5B. The network connection 402 may include a SCD that conducts the methods shown in FIGS. 6 and 7. The network connection 402 may be used in the embodiments shown in FIGS. 8-10.

As shown in FIG. 4C, a user 405 is connected to a SCD 410 through a data connection 425. The SCD 410 is connected to the user 405, a host 420, and a could service 415 through data connections 425. As shown in FIG. 4C, the SCD 410 works as a connection node among the user 405, the host 420, and the cloud service 415. The user 405 is connected to the could service 415 through the SCD 410. The host 420 is connected to the cloud service 415 through the SCD 410.

Figure 5A:
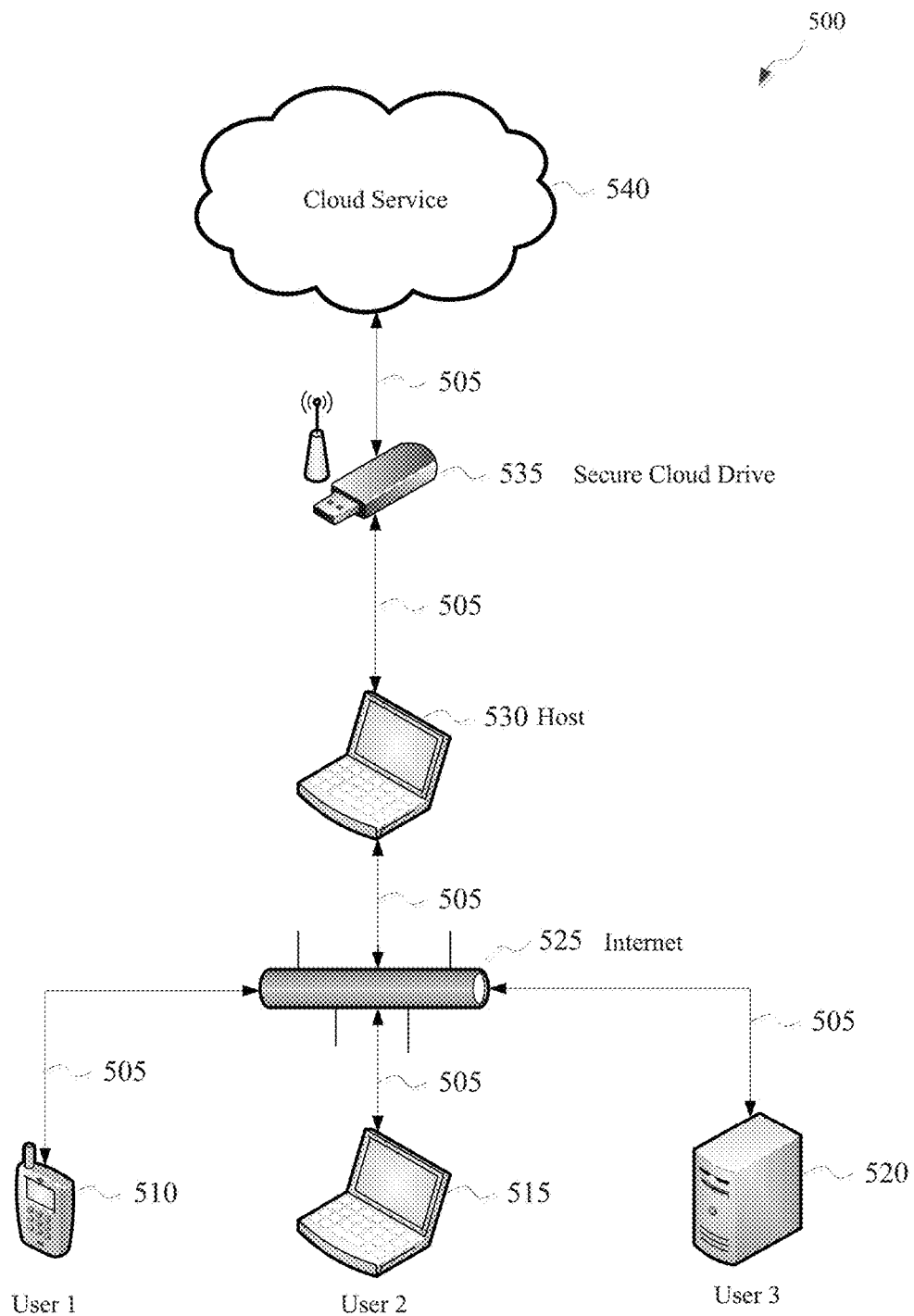
FIG. 5A is a schematic block diagram illustrating a network connection including a secure cloud drive according to one embodiment of the disclosure.

FIG. 5A is a schematic block diagram illustrating a network connection 500 including a secure cloud drive 535 according to one embodiment of the disclosure. The network connection 500 may include any of the SCDs 105, 110, 140 shown in FIGS. 1A-1C. The network connection 500 may include a SCD that has the volume structure 200 shown in FIG. 2. The network connection 500 may be used as part or in combination with the network connections shown in FIGS. 4A-4C and 5B. The network connection 500 may include a SCD that conducts the methods shown in FIGS. 6 and 7. The network connection 500 may be used in the embodiments shown in FIGS. 8-10.

As shown in FIG. 5A, user 1 510, user 2 515, and user 3 520 are connected to the Internet 525 through data connections 505. It is noted that the Internet 525 can also be included in the data connection 505. User 1 510 is a mobile phone. User 2 515 is a laptop. User 3 520 is a desktop. The data connections 505 may be wired or wireless connections. The host 530 is connected to the Internet 525 through a data connection 505. The SCD 535 is connected to the cloud service 540 and the host 530 through the data connection 505.

In the network connection 500, users 510, 515, 520, may connect to the cloud service 540 through the SCD 535. The users 510, 515, 520, may connect to the SCD 535 through the host 530. In one embodiment, the SCD 535 may be physically connected to the host through an USB connection. In another embodiment, the SCD 535 may be wirelessly connected to the cloud service 540. In one embodiment, the SCD 535 works as a connecting node to the cloud service 540 for users 510, 515, 520 as shown in FIG. 5A.

Figure 5B:
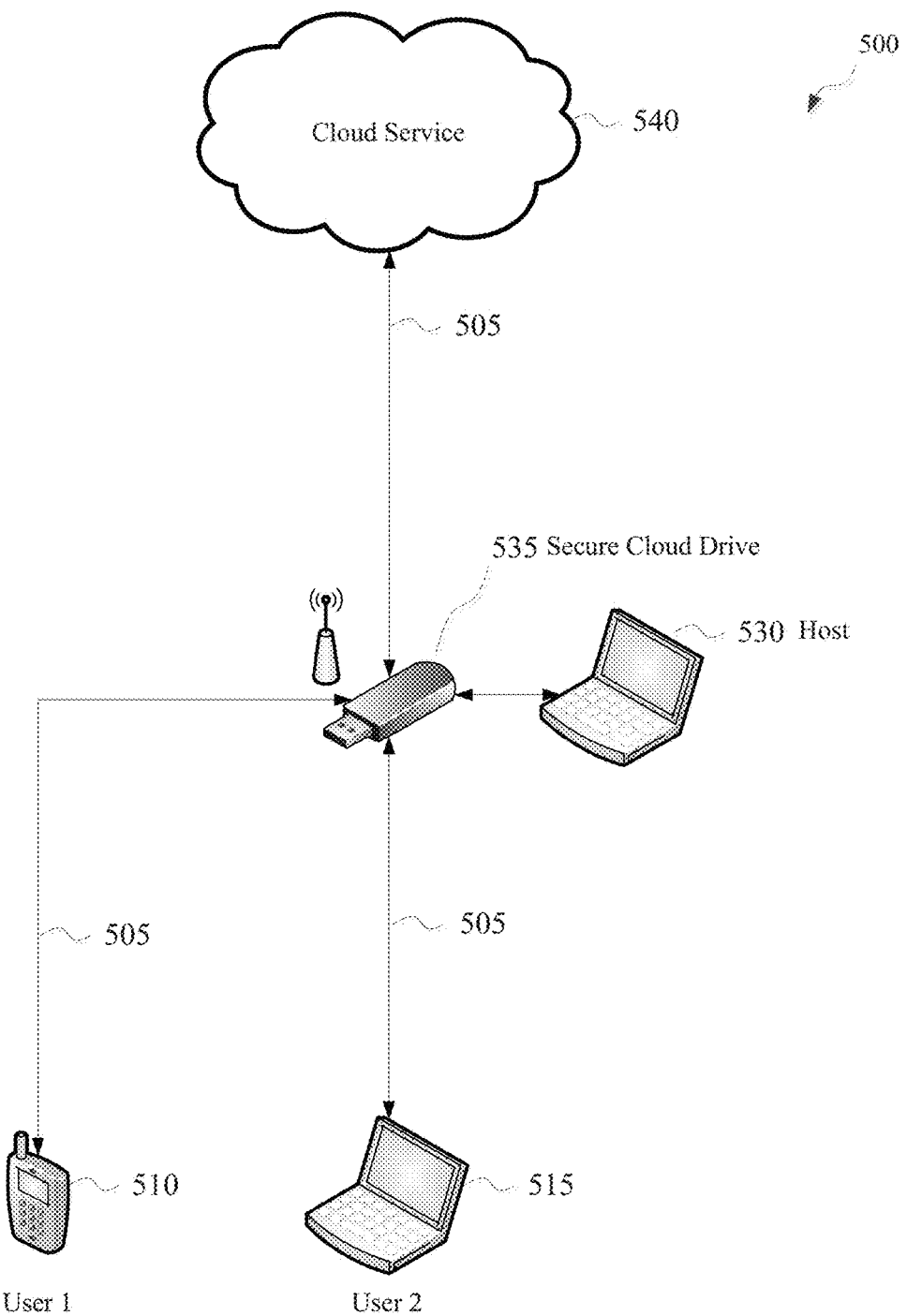
FIG. 5B is a schematic block diagram illustrating a network connection including a secure cloud drive according to one embodiment of the disclosure.

FIG. 5B is a schematic block diagram illustrating a network connection 501 including a secure cloud drive 535 according to one embodiment of the disclosure. The network connection 501 may include any of the SCDs 105, 110, 140 shown in FIGS. 1A-1C. The network connection 501 may include a SCD that has the volume structure 200 shown in FIG. 2. The network connection 501 may be used as part or in combination with the network connections shown in FIGS. 4A-4C and 5A. The network connection 501 may include a SCD that conducts the methods shown in FIGS. 6 and 7. The network connection 501 may be used in the embodiments shown in FIGS. 8-10.

As shown in FIG. 5B, user 1 510 and user 2 515 are connected to a SCD 535 through data connections 505. User 1 510 is a mobile phone. User 2 515 is a laptop. The data connections 505 may be wired or wireless connections. The host 530 is connected to SCD 535 through a data connection 505. The SCD 535 is connected to the cloud service 540 and the host 530 through the data connection 505.

In the network connection 501, users 510, 515 may connect to the cloud service 540 through the SCD 535. The users 510, 515 may not need to connect to the SCD 535 through the host 530. In one embodiment, the SCD 535 may be physically connected to the host through an USB connection. In another embodiment, the SCD 535 may be wirelessly connected to the cloud service 540. In another embodiment, the SCD 535 may be a standalone apparatus that is not connected to the host 530. In the network connection 501, the SCD 535 works as a connecting node to the cloud service 540 for users 510 515 as shown in FIG. 5B.

Figure 6:
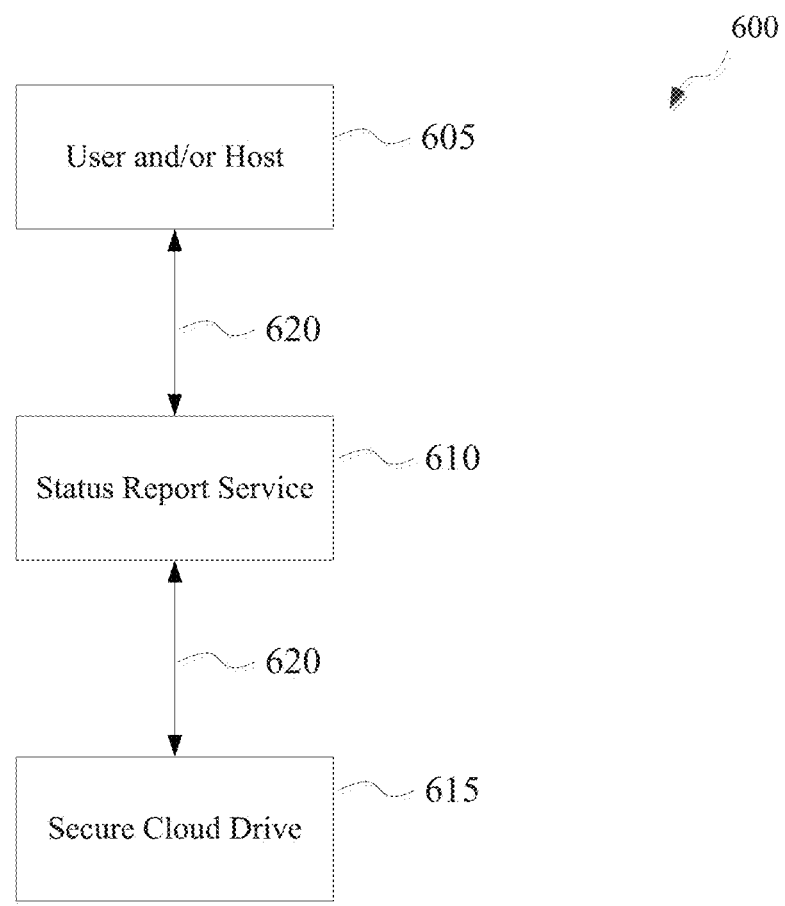
FIG. 6 is a flow chart illustrating a method for accessing a status report service according to one embodiment of the disclosure.

FIG. 6 is a flow chart illustrating a method 600 for accessing a status report service according to one embodiment of the disclosure. The method 600 may be included in the SCD 105 in FIG. 1A. The method 600 may be included in the security feature 135 in FIG. 1B. The method 600 may be used in combination with the fingerprint scanner in FIG. 1C. The instructions establishing the method 600 may be stored in the setup volume 205 in FIG. 2. The method 600 may be used as part or in combination with the methods shown in FIGS. 3 and 7. The method 600 may be used in the network connections shown in FIGS. 4A-D and 5A-B. The method 600 may be implemented in the embodiments shown in FIGS. 8-10.

The status report service 610 is an apparatus or a method that protects information stored in an SCD from being undesirably accessed. The status report service 610 includes a record of the security status of one or more SCDs 615. The status report service 610 is constantly updated for the newest status of the SCDs 615. In one embodiment, a user and/or host 605 may connect to the status report service 610 through a data connection 620. In another embodiment, a SCD 615 may connect to the status report service 610 through a data connection 620.

In one situation, a host 605 may have lost possession of the SCD 615, for example, the SCD 615 is stolen. In such a situation, the host 605 may manually report to the status report service 610 that a specific SCD 615 is lost. Once the SCD 615 is reported as lost, the status report service 610 may put a security alert regarding the SCD 615. Subsequently, when the SCD 615 attempts to connect to a data connection, e.g., an Internet connection, the SCD 615 may automatically check the status report service 610 before decrypting any information. If there is a security alert regarding the SCD 615 recorded in the status report service 610, the SCD 615 may take security actions.

In one embodiment, security action may include rejecting all hosts/users' attempts to access the information stored in the SCD 615. The security action may include self-erasing all the information stored in the SCD 615. The security action may include increasing the levels of authentication process for every hosts/users, for example, requiring all hosts/users to verify both fingerprints and passwords. The security action may include prohibiting the information stored in the storage volume from being decrypted regardless of whether the authentication process is completed. It is noted that the above security actions are given as examples. These examples are in no way limiting the scope of the disclosure.

The status report service 610 may be an apparatus that includes a processor which establishes the operating functions of the status report service 610. The status report service 610 may also be a method that can be executed on various machines, e.g., a personal computer, a server, a mobile phone, a tablet, a cloud service center, etc.

Figure 7:
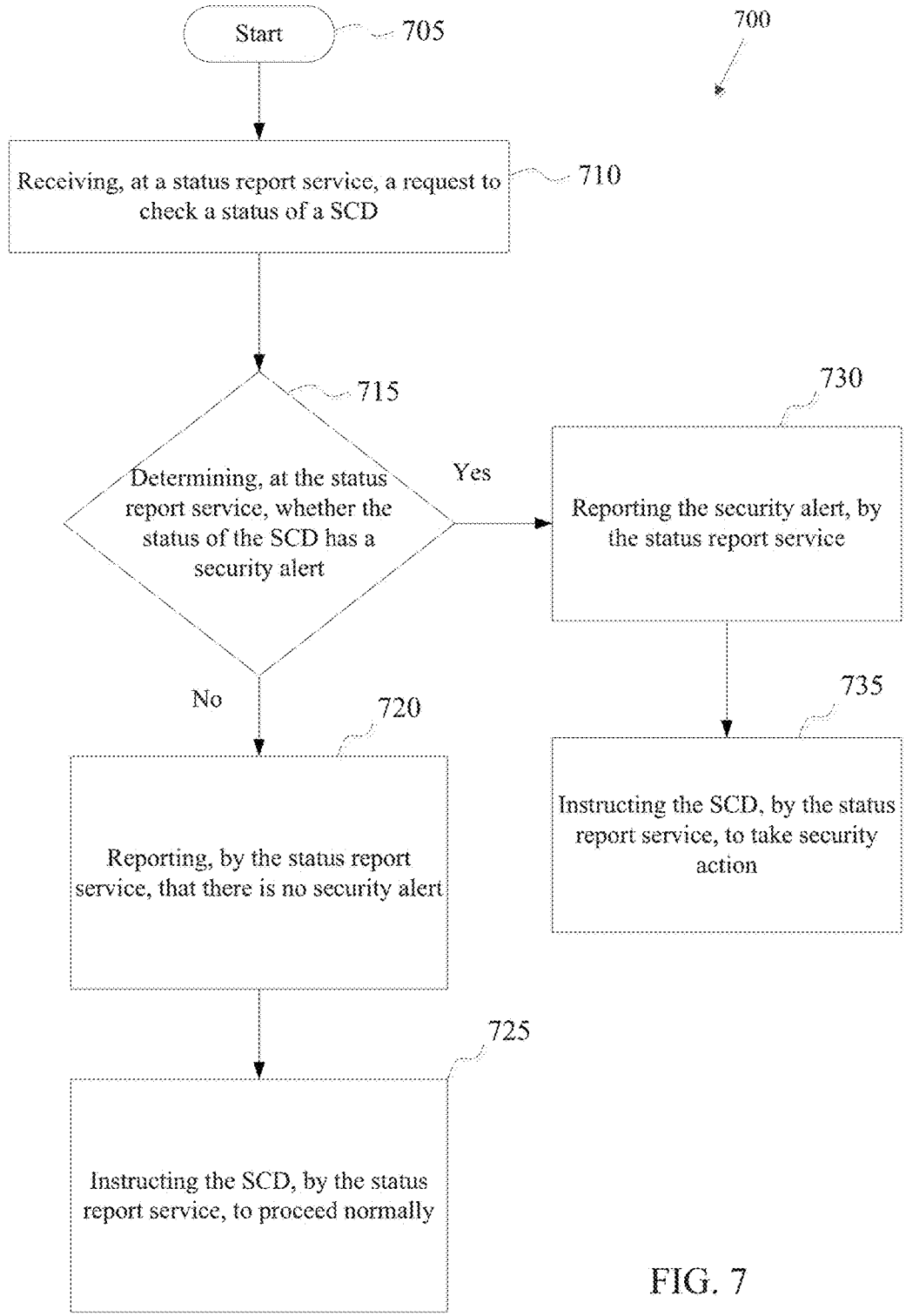
FIG. 7 is a flow chart illustrating a method for accessing a status report service according to one embodiment of the disclosure.

FIG. 7 is a flow chart illustrating a method 700 for accessing a status report service according to one embodiment of the disclosure. The method 700 may be included in the SCD 105 in FIG. 1A. The method 700 may be included in the security feature 135 in FIG. 1B. The method 700 may be used in combination with the fingerprint scanner in FIG. 1C. The instructions establishing the method 700 may be stored in the setup volume 205 in FIG. 2. The method 700 may be used as part or in combination with the methods shown in FIGS. 3 and 6. The method 700 may be used in the network connections shown in FIGS. 4A-D and 5A-B. The method 700 may be implemented in the embodiments shown in FIGS. 8-10.

As shown in FIG. 7, the method 700 starts at block 705. The method 700 proceeds to block 710, which includes receiving, at a status report service, a request to check a status of a SCD. The method 700 proceeds to block 715, which includes determining, at the status report service, whether the status of the SCD has a security alert. If there is no security alert regarding the SCD, the method 700 proceeds to block 720, which includes reporting, by the status report service, that there is no security alert. The method 700 proceeds to block 725, which includes instructing SCD, by the status report service, to proceed normally. If there is a security alert regarding the SCD, the method 700 proceeds to block 730, which includes reporting the security alert, by the status report service. The method 700 proceeds to block 735, which includes instructing the SCD, by the status report service, to take security action.

In one embodiment, security action at block 735 may include rejecting all hosts/users' attempts to access the information stored in the SCD. The security action at block 735 may include self-erasing all the information stored in the SCD. The security action at block 735 may include increasing the levels of authentication process for every hosts/users, for example, requiring all hosts/users to verify both fingerprints and passwords. The security action at block 735 may include prohibiting the information stored in the storage volume from being decrypted regardless of whether the authentication process is completed. It is noted that the above security actions are given as examples. These examples are in no way limiting the scope of the disclosure.

Figure 8:
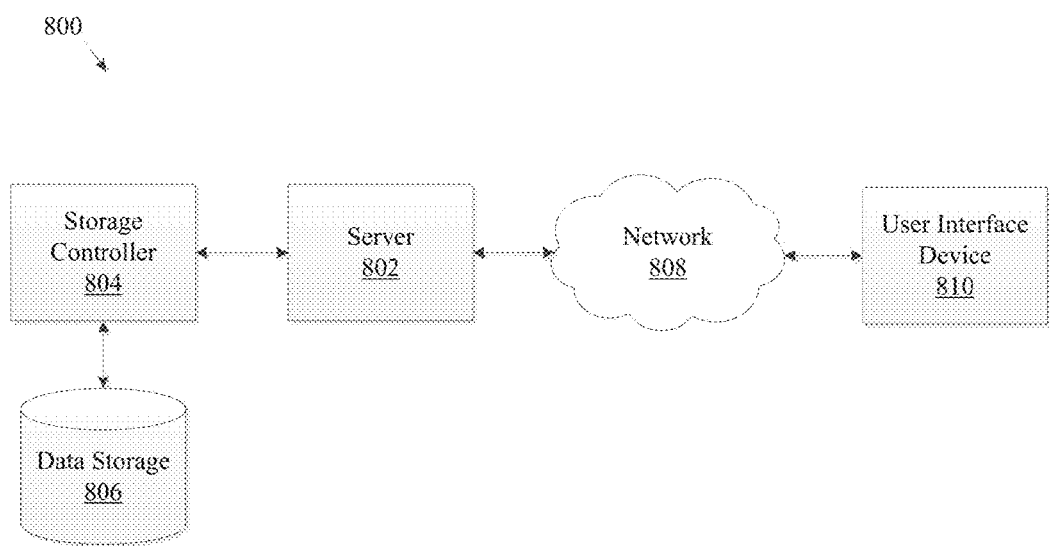
FIG. 8 is a block diagram illustrating a computer network according to one embodiment of the disclosure.

FIG. 8 illustrates a computer network 800 for obtaining access to database files in a computing system according to one embodiment of the disclosure. The system 800 may include a server 802, a data storage device 806, a network 808, and a user interface device 810. The server 802 may also be a hypervisor-based system executing one or more guest partitions hosting operating systems with modules having server configuration information. In a further embodiment, the system 800 may include a storage controller 804, or a storage server configured to manage data communications between the data storage device 806 and the server 802 or other components in communication with the network 808. In an alternative embodiment, the storage controller 804 may be coupled to the network 808.

In one embodiment, the user interface device 810 is referred to broadly and is intended to encompass a suitable processor-based device such as a desktop computer, a laptop computer, a personal digital assistant (PDA) or tablet computer, a smartphone or other mobile communication device having access to the network 808. In a further embodiment, the user interface device 810 may access the Internet or other wide area or local area network to access a web application or web service hosted by the server 802 and may provide a user interface for enabling a user to enter or receive information.

The network 808 may facilitate communications of data between the server 802 and the user interface device 810. The network 808 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 9:
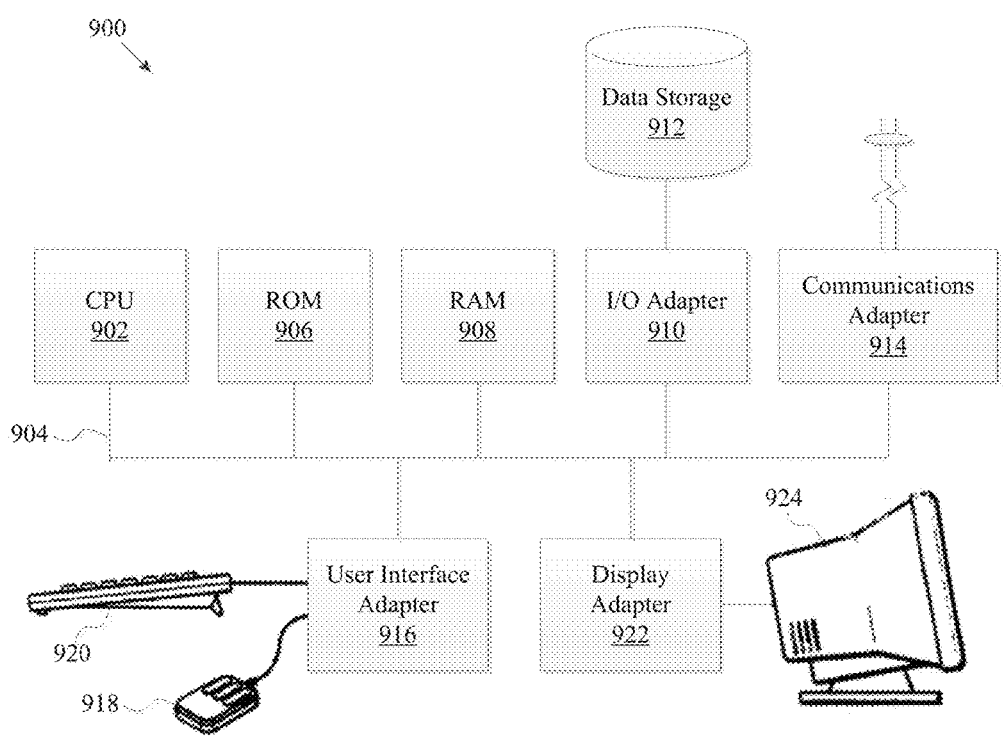
FIG. 9 is a block diagram illustrating a computer system according to one embodiment of the disclosure.

FIG. 9 illustrates a computer system 900 adapted according to certain embodiments of the server 802 and/or the user interface device 810. The central processing unit ("CPU") 902 is coupled to the system bus 904. The CPU 902 may be a general purpose CPU or microprocessor, graphics processing unit ("GPU"), and/or microcontroller. The present embodiments are not restricted by the architecture of the CPU 902 so long as the CPU 902, whether directly or indirectly, supports the operations as described herein. The CPU 902 may execute the various logical instructions according to the present embodiments.

The computer system 900 may also include random access memory (RAM) 908, which may be synchronous RAM (SRAM), dynamic RAM (DRAM), synchronous dynamic RAM (SDRAM), or the like. The computer system 900 may utilize RAM 908 to store the various data structures used by a software application. The computer system 900 may also include read only memory (ROM) 906 which may be PROM, EPROM, EEPROM, optical storage, or the like. The ROM may store configuration information for booting the computer system 900. The RAM 908 and the ROM 906 hold user and system data, and both the RAM 908 and the ROM 906 may be randomly accessed.

The computer system 900 may also include an I/O adapter 910, a communications adapter 914, a user interface adapter 916, and a display adapter 922. The I/O adapter 910 and/or the user interface adapter 916 may, in certain embodiments, enable a user to interact with the computer system 900. In a further embodiment, the display adapter 922 may display a graphical user interface (GUI) associated with a software or web-based application on a display device 924, such as a monitor or touch screen.

The I/O adapter 910 may couple one or more storage devices 912, such as one or more of a hard drive, a solid state storage device, a flash drive, a compact disc (CD) drive, a floppy disk drive, and a tape drive, to the computer system 900. According to one embodiment, the data storage 912 may be a separate server coupled to the computer system 900 through a network connection to the I/O adapter 910. The communications adapter 914 may be adapted to couple the computer system 900 to the network 808, which may be one or more of a LAN, WAN, and/or the Internet. The user interface adapter 916 couples user input devices, such as a keyboard 920, a pointing device 918, and/or a touch screen (not shown) to the computer system 900. The display adapter 922 may be driven by the CPU 902 to control the display on the display device 924. Any of the devices 902-922 may be physical and/or logical.

The applications of the present disclosure are not limited to the architecture of computer system 900. Rather the computer system 900 is provided as an example of one type of computing device that may be adapted to perform the functions of the server 802 and/or the user interface device 910. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 900 may be virtualized for access by multiple users and/or applications.

If implemented in firmware and/or software, the functions described above may be stored as one or more instructions or code on a computer-readable medium. Examples include non-volatile computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A secure cloud drive (SCD), which is a portable device, comprising:
  a processor configured to establish operating functions of the SCD;
  a computer-readable medium including a setup volume and a storage volume, the setup volume being configured to store information that is decrypted, and the storage volume being configured to store information that is encrypted, wherein the setup volume includes:
    instructions that direct the processor to establish at least one local authentication process in response to an access request to decrypt the information of the storage volume, the at least one local authentication process having a selectable level of authentication that is selected from among a plurality of different available levels of authentication including a first level and a second level;
    instructions that direct the processor, in response to the access request, to initiate communications with a remote status report service via a network to check a current security status of the SCD, the status report service being physically separated from the SCD, wherein the current security status was stored prior to the check in a second computer readable medium at the remote status report service; and
    instructions that take security action if the security status reflects a security alert, wherein the security action includes increasing the selectable level of authentication for the local authentication process from the first level to the second level based on the current security status of the SCD;
  a communications interface to transmit information stored in the computer-readable medium to a host or a user.

2. The SCD according to claim 1, further comprising, a wireless communication feature through which information stored in the computer-readable medium is communicated to a host or a user.

3. The SCD according to claim 1, wherein the at least one local authentication process verifies a biometric feature or a password.

4. The SCD according to claim 3, wherein the biometric feature is a fingerprint or voice recognition.

5. A method, comprising:
  receiving, at a first processor, at a status report service, a status update pertaining to a remote secure cloud drive (SCD) and storing a current status of the SCD based on the status update;
  thereafter, receiving, at the first processor, at the status report service, via a network, a request to check the current status of the SCD, the SCD being a portable drive, wherein the SCD is to:
    administer at least one local authentication process in response to an access request to decrypt information stored in the SCD, the at least one local authentication process having a selectable level of authentication that is selected from among a plurality of different available levels of authentication including a first level and a second level, and
    in response to the access request, send the request to check the current status of the SCD, via the network;
  determining, at the first processor, whether the current status of the SCD has a security alert; and
  instructing the SCD, by the first processor, via the network, to take security action if the status reflects a security alert, wherein the security action includes increasing the selectable level of authentication for the local authentication process from the first level to the second level.

6. The method according to claim 5, further comprising, instructing the SCD, by the first processor, to proceed normally if there is no security alert.

7. The method according to claim 5, further comprising, reporting, by the first processor, the security alert; or reporting, by the first processor, that there is no security alert.

8. The method according to claim 5, wherein the security action includes erasing the information stored in the storage volume.

9. The method according to claim 6, wherein instructing the SCD, by the first processor, to proceed normally further includes, instructing the SCD to conduct the at least one local authentication process according to the first level of authentication.

10. An automated method of operating a portable secure cloud drive (SCD), the method comprising:
  storing, at the SCD, information in an encrypted state;
  receiving, at the SCD, an access request to decrypt the information;
  in response to the access request, administering, at the SCD, at least one local authentication process having a selectable level of authentication that is selected from among a plurality of different available levels of authentication including a first level and a second level;
  in response to the access request, initiating communications, by the SCD, with a remote status report service physically separated from the SCD, via a network, to check a current security status of the SCD, the security status having been stored prior to a time of the access request;
  taking security action, by the SCD, if the security status reflects a security alert, wherein the security action includes increasing the selectable level of authentication for the local authentication process from the first level to the second level based on the current security status of the SCD; and
  in response to successful completion of the authentication process at the second level, decrypting the information and transmitting the information in a decrypted state to a host device.

11. The method of claim 10, wherein the available levels of authentication of the local authentication process include:
   verifying a biometric feature; and
   verifying a password and the biometric feature.

12. The method of claim 10, further comprising,
   receiving, at the SCD, instructions to store information in the storage volume.

13. The SCD according to claim 1, wherein the SCD serves as a communication node for the user to access a secured cloud service.

14. The SCD according to claim 1, wherein a user of the SCD has access to a secured cloud service only if the authentication process is completed and the current security status reflects no security alert.

15. The method of claim 5, wherein the at least one authentication process includes verifying a biometric feature or a password.

16. The method of claim 10, wherein the SCD serves as a communication node for the user to access a secured cloud service.

17. The method of claim 10, wherein a user of the SCD has access to a secured cloud service only if the authentication process is completed and the security status reflects no security alert.

* * * * *